United States Patent
Yochai

(10) Patent No.: US 8,938,426 B2
(45) Date of Patent: Jan. 20, 2015

(54) SYSTEM, METHOD AND COMPUTER READABLE MEDIUM FOR EFFIEICNT SNAPSHOT-BASED MIRRORING OPERATIONS

(71) Applicant: Yechiel Yochai, Moshav Aviel (IL)

(72) Inventor: Yechiel Yochai, Moshav Aviel (IL)

(73) Assignee: Infinidat Ltd., Herzliya (IL)

(*) Notice: Subject to any disclaimer, the term of this patent is extended or adjusted under 35 U.S.C. 154(b) by 294 days.

(21) Appl. No.: 13/717,784

(22) Filed: Dec. 18, 2012

(65) Prior Publication Data

US 2014/0172801 A1 Jun. 19, 2014

(51) Int. Cl.
*G06F 17/00* (2006.01)
*G06F 17/30* (2006.01)

(52) U.S. Cl.
CPC ............................. *G06F 17/30575* (2013.01)
USPC ........................... 707/639; 707/649; 707/655

(58) Field of Classification Search
USPC ........................................ 707/639, 649, 655
See application file for complete search history.

(56) References Cited

U.S. PATENT DOCUMENTS

| 6,725,331 | B1* | 4/2004 | Kedem | 711/117 |
| 2006/0047928 | A1* | 3/2006 | Bhasin et al. | 711/162 |
| 2008/0082593 | A1* | 4/2008 | Komarov et al. | 707/204 |

* cited by examiner

*Primary Examiner* — Pierre Vital
*Assistant Examiner* — Andalib Lodhi
(74) *Attorney, Agent, or Firm* — Oren Reches

(57) ABSTRACT

A storage system that may include a management module, a communication module and a storage module; wherein the management module is arranged to receive, at an intermediate point in time that occurs between the first point in time and a second point in time, a first request that indicates that a certain extent of the second logical volume is irrelevant; participate in a creation of second point in time snapshots of the first and second logical volumes; select, in response to the first request, out of all data deltas generated between the first and second point in time, selected data deltas to be transmitted to the other storage system; wherein the selected data deltas exclude data deltas associated with the certain extent that were generated between the first point in time and the intermediate point in time.

17 Claims, 12 Drawing Sheets

SYSTEM, METHOD AND COMPUTER READABLE MEDIUM FOR EFFIEICNT SNAPSHOT-BASED MIRRORING OPERATIONS

BACKGROUND

Asynchronous Remote Mirroring

A storage system may store multiple logical volumes. A known method for safeguarding the data included in the multiple logical volumes is known as remote mirroring and involves creating copies (also referred to as mirror copies or remote mirrors) of the multiple logical volumes at another storage system (remote storage system). A logical volume that is mirrored can be referred to as a mirrored logical volume. It is noted that although mirroring operations are deemed to involve remote and local storage system these storage systems can be proximate to each other.

The local storage system may be required to warrant that in the remote mirror there is always a consistent image of the mirrored logical volume. The remote mirror can be used for restoring the mirrored logical volume in case of a local storage system failure, and specifically a disaster.

This requires to warrant that ordered writes must be preserved so that if for a given data portion A is written before B in the local storage system, it will never be the case that B will be committed in the remote storage system before A was committed.

This challenge may be addressed by using snapshots, as it is well-known in the art.

A snapshot represents a logical volume at a selected point in time. Such a snapshot may include changes (data deltas) in the content of that logical volume that occurred between the selected point in time and a previous point in time in which a previous snapshot of that logical volume was generated.

The local storage system is expected to create different point in time snapshots of the mirrored logical volumes and to transmit the data deltas of the created different point in time snapshots to the remote storage system.

For example, a local storage system (LSS) can generate at a first point in time (Tn) a snapshot (VSn) of logical volume VSS and it may transmit VSn to the remote storage system (RSS) that in turn may create RVSS.

LSS can also generate at a second point in time (Tn+1) a next snapshot (VSn+1) of VSS. After RSS acknowledges the transmission of the entire data of VSn this data is committed to RSS and RSS is regarded (for example by LSS) to have a consistent image at RV.

Index n is a positive integer. Points in time Tn and Tn+1 are referred as first and second points in time merely to distinguish them from each other.

The creation of Vsn+1 is followed by transmitting the data deltas associated with VSS that were created between VSn and VSn+1.

Whenever a disaster situation happens (local storage system fails), the last consistent image attained at RSS can be used for restoring activity either from V at LSS (after its recovery), or from RV at RSS.

The transmission of such data deltas from LSS to RSS is resource consuming and time consuming.

There is a growing need to reduce the time of such transmission and to reduce the amount of data transmitted from the local storage system to the remote storage system without hampering the mirroring process.

SUMMARY

According to an embodiment of the invention various methods may be provided and are described in the specification. According to various embodiments of the invention there may be provided a non-transitory computer readable medium that may store instructions for performing any of the methods described in the specification and any steps thereof, including any combinations of same. Additional embodiments of the invention include a storage system arranged to execute any or all of the methods described in the specification above, including any stages—and any combinations of same.

According to an embodiment of the invention there may be provided a storage system that may include a management module, a communication module and a storage module; wherein the storage system may be arranged to create first point in time snapshots of first and second logical volumes; wherein the communication module may be arranged to transmit data deltas associated with the first point in time snapshots to another storage system; wherein the other storage system is managed by another management module; wherein the management module may be arranged to: receive, at an intermediate point in time that occurs between the first point in time and a second point in time, a first request that indicates that a certain extent of the second logical volume is irrelevant; participate in a creation of second point in time snapshots of the first and second logical volumes; select, in response to the first request, out of all data deltas generated between the first and second point in time, selected data deltas to be transmitted to the other storage system; wherein the selected data deltas exclude data deltas associated with the certain extent that were generated between the first point in time and the intermediate point in time; wherein the communication module may be further arranged to: transmit the selected data deltas to the other storage system; and transmit to the other management module a second request that indicates that a content, before the intermediate point in time, of the certain extent of the second logical volume is irrelevant for a creation of a mirror copy of the second logical volume at the other storage system.

The first request may be an extended copy command for replacing the certain extent by a replacing extent of the first logical volume.

The management module may be arranged to participate in a creation of intermediate point in time snapshots of the first and second logical volumes.

The management module may be arranged to participate in a creation of an intermediate point in time snapshot of the replacing extent.

The communication module may be arranged to transmit the selected data deltas to the other storage system after a completion of the creation of the intermediate point in time snapshot of the replacing extent.

The management module may be arranged to execute the extended copy command and to participate in the creation of an intermediate point in time snapshot of the replacing extent as an atomic operation.

The management module may be arranged to execute the extended copy command and to participate in the creation of an intermediate point in time snapshot of the first and second logical volumes as an atomic operation.

The management module may be arranged to select selected data deltas that comprise data deltas associated with the certain extent that were generated between the intermediate point in time and the second point in time.

The management module may be arranged to send to the other management module the second request, wherein the second request is for replacing a mirror copy of the certain extent by a mirror copy of the replacing extent.

The first request may be a un-map command.

The management module may be arranged to participate in a creation of an intermediate point in time snapshot of the second logical volume.

The management module may be arranged to execute the un-map command and to participate in the creation of the intermediate point in time snapshot of the second logical volume as an atomic operation.

The management module may be arranged to: receive, at a further point in time that occurs between the intermediate point in time and the second point in time, a further request that indicates that a further extent of the second logical volume is irrelevant; select, in response to the further request and the first request, out of all data deltas generated between the first and second point in times, selected data deltas to be transmitted to the other storage system during a transmittal of the second point in time snapshots; wherein the selected data deltas exclude data deltas associated with the certain extent that were generated between the first point in time and the intermediate point in time and exclude data deltas associated with the further extent generated between the first point in time and the further point in time.

A method, may be provided and may include: creating at a storage module first point in time snapshots of first and second logical volumes; transmitting data deltas associated with the first point in time snapshots to another storage system; wherein the other storage system is managed by another management module; receiving, at an intermediate point in time that occurs between the first point in time and a second point in time, a first request that indicates that a certain extent of the second logical volume is irrelevant; creating second point in time snapshots of the first and second logical volumes; selecting, in response to the first request, out of all data deltas generated between the first and second point in times, selected data deltas to be transmitted to the other storage system during a transmittal of the second point in time snapshots; wherein the selected data deltas exclude data deltas associated with the certain extent that were generated after the intermediate point in time; transmitting the selected data deltas to the other storage system; and transmitting to the other management module a second request that indicates that a content, before the intermediate point in time, of the certain extent of the second logical volume is irrelevant for a creation of a mirror copy of the second logical volume at the other storage system.

A non-transitory computer readable medium that stores instructions to be executed by a storage system for: creating at a storage module first point in time snapshots of first and second logical volumes; transmitting data deltas associated with the first point in time snapshots to another storage system; wherein the other storage system is managed by another management module; receiving, at an intermediate point in time that occurs between the first point in time and a second point in time, a first request that indicates that a certain extent of the second logical volume is irrelevant; creating second point in time snapshots of the first and second logical volumes; selecting, by a management module of the storage system and in response to the first request, out of all data deltas generated between the first and second point in times, selected data deltas to be transmitted to the other storage system during a transmittal of the second point in time snapshots; wherein the selected data deltas exclude data deltas associated with the certain extent that were generated between the first point in time and the intermediate point in time; transmitting the selected data deltas to the other storage system; and transmitting to the other management module a second request that indicates that the certain extent of the second logical volume is irrelevant for a creation of a mirror copy of the second logical volume at the other storage system.

The first request is an extended copy command for replacing the certain extent by a replacing extent of the first logical volume.

A management module of a storage system, the management module may be arranged to: receive, at an intermediate point in time that occurs between a first point in time during which a first point in time snapshots of a first and second logical volumes are created and a second point in time during which a second point in time snapshots of the first and second logical volume are created, a first request that indicates that a certain extent of the second logical volume is irrelevant; participate in a creation of the second point in time snapshots of the first and second logical volumes; select, in response to the first request, out of all data deltas generated between the first and second point in time, selected data deltas to be transmitted to the other storage system; wherein the selected data deltas exclude data deltas associated with the certain extent that were generated between the first point in time and the intermediate point in time; instruct a communication module to transmit the selected data deltas to the other storage system; and transmit to the other management module a second request that indicates that a content, before the intermediate point in time, of the certain extent of the second logical volume is irrelevant for a creation of a mirror copy of the second logical volume at the other storage system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
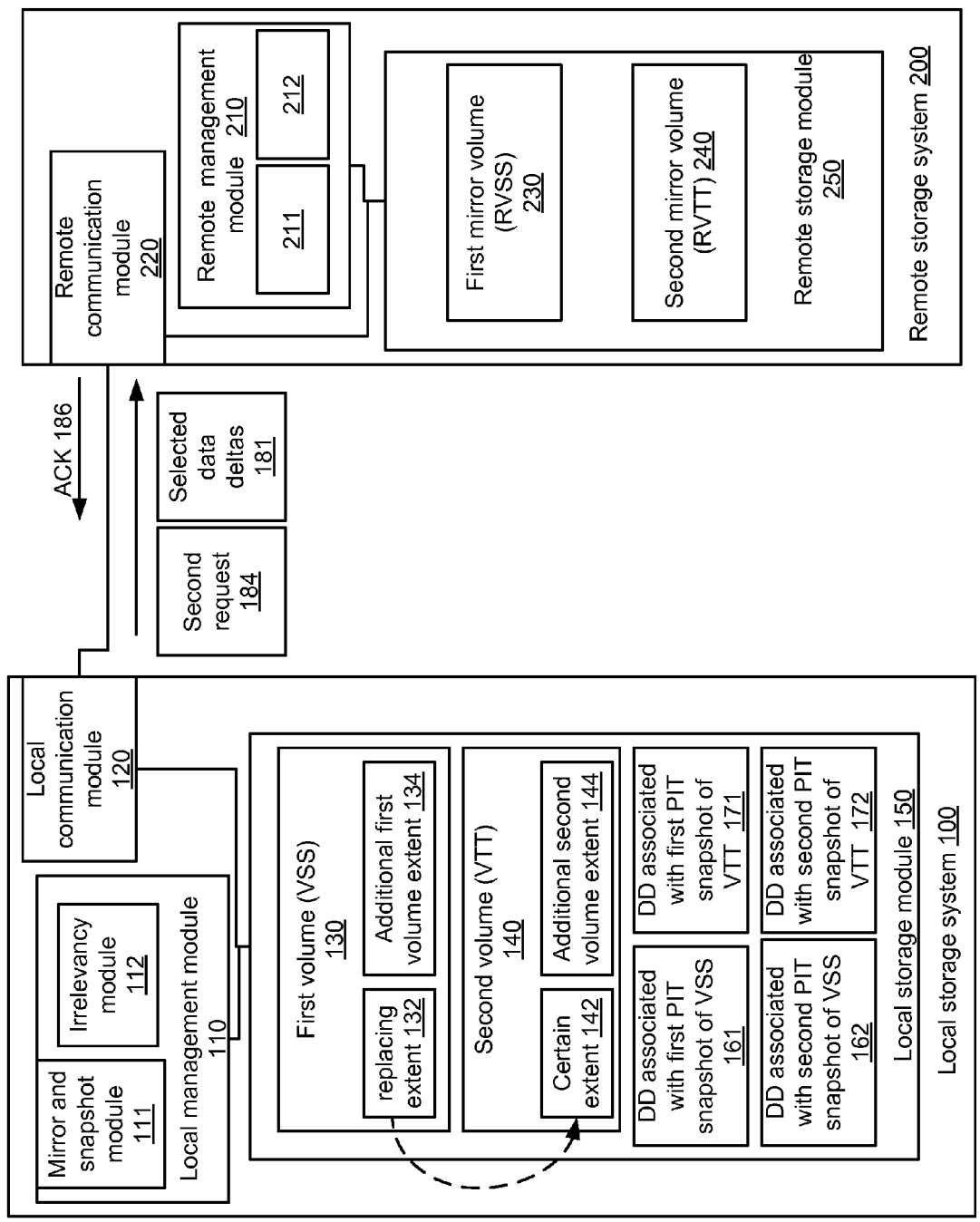
FIG. 1 illustrates a local storage system and a remote storage system, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The overall size of data deltas transmitted from the local storage system to the remote storage system can be reduced when it is determined that some of the data deltas associated with a mirrored logical volume are irrelevant. In these cases, only part of the data deltas should be transmitted while the desired image can nevertheless be created at RSS.

The following two examples are relevant:
A. Unmap an extent at VTT. Unmaping an extent within a first logical volume (VTT), say a certain extent of length EL starting at LBA1, means that data that was currently associated with VTT in that certain extent ceases to be associated with the logical volume, and for this extent the situation is as if no data at all had ever been written there. In general a host will not direct input/output (IO) activity to an extent that has been unmapped, but if it does, then the system may reply by either declaring an error or returning a row of zeroes.
B. Copy extent in LSS. The Extended Copy is a SCSI command (83h) that allows copying a certain extent from a source logical volume (VSS) to a target logical volume (VTT), both in RSS. The parameters are a starting LBA in VSS (LBASS), a target LBA in VTT (LBATT), and a block length of the extent.

Responding to an Extended Copy Command

There are provided methods, storage systems and computer readable media for reducing the amount of data transmitted during asynchronous mirroring if while transmitting data deltas of a logical volumes VSS and VTT the LSS receives an extended copy command for copying an extent from logical volume VSS to logical volume VTT of LSS.

FIG. 1 illustrates a storage system such as a local storage system 100 and another storage system such as remote storage system 200 according to an embodiment of the invention.

The local storage system 100 includes a local management module 110, a local communication module 120 and a local storage module 150.

The local storage module 150 can store multiple logical volumes such as first logical volume VSS 130 and second logical volume VTT 140.

At a first point in time (such as Tn) the local storage system 100 creates snapshot SVSSn of VSS and snapshot SVTTn of VTT.

The local storage system 100 then starts to transmit all the data deltas generated between the creation of the previous snapshots (created at Tn−1) and Tn, for both logical volumes VTT 140 and VSS 130. The transmission of data deltas to the remote storage system RSS can be implemented by executing write commands in RSS, that result in a creation of mirror copy RVSS of VSS and mirror copy RVTT of VTT.

In the following figures it is assumed that a point in time snapshot is represented by data deltas that are associated with it. The storage system may store data deltas created in different point in time and associated them with different point in time snapshots.

At an intermediate point in time (T'n) that occurs between Tn and Tn+1, an extended copy command is received by the local management module 110 and this command instructs the local management module 110 to copy a replacing extent 132 (LBASS, length) of VSS 130 to a replaced extent 142 (LBATT, length) in VTT 140. The extended copy command may be sent to the local storage systems by an administrator, from a host computer or in any other manner.

The intermediate point in time T'n may occur before the data deltas relating to the replaced extent 142 are transmitted to the remote storage system 200 and may occur before a second point in time (Tn+1) during which the next snapshots (for mirroring purposes) SVSSn+1 and SVSSn+1 should be taken. Accordingly, Tn<T'n<Tn+1.

According to an embodiment of the invention, upon receipt (at T'n) of the extended copy command, and before executing the command itself, the local management module 110 may create an intermediate point in time snapshot (intermediate snapshot) of at least one out of VSS, VTT and replacing extent 132.

This intermediate snapshot can be regarded as a special snapshot as it is not generated during the ordinary mirroring process. Additionally or alternatively, it may be regarded as a special snapshot as it may create a snapshot of an extent and not of a whole volume. FIG. 1 illustrates a mirror and snapshot module 11 that is responsive for the ordinary mirroring process and the creation of mirror snapshots such as those created at points in time Tn, Tn+1 and the like while irrelevancy module 112 may respond to the Extended Copy command.

Figure 2:
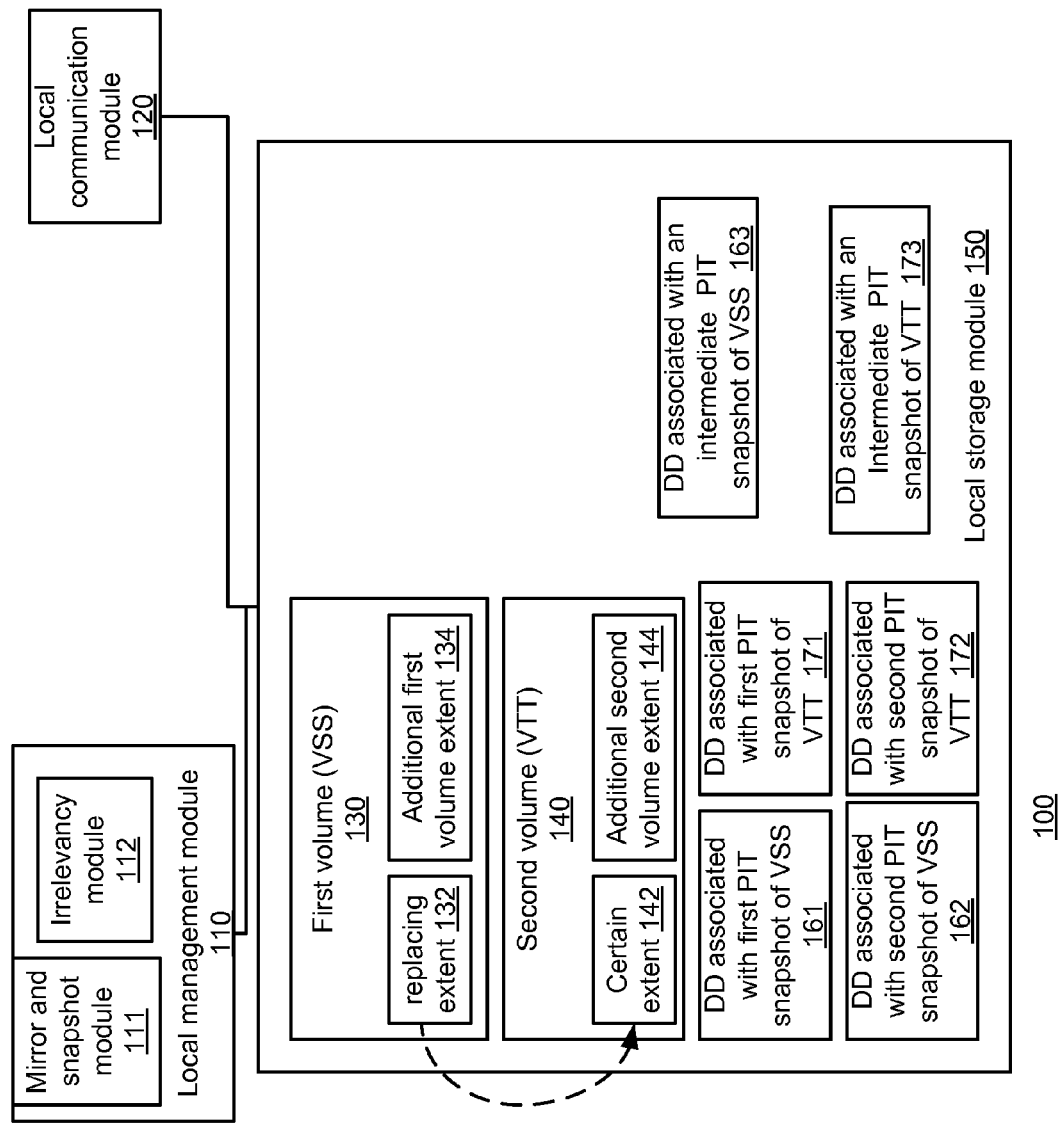
FIG. 2 illustrates a local storage system, according to an embodiment of the invention.

FIG. 1 does not illustrate the creation of such intermediate snapshots. FIG. 2 illustrates the local storage system 150 as storing data deltas 163 associated with intermediate snapshot SVSS'n of VSS and data deltas 173 associated with an intermediate snapshot SVTT'n of VTT.

Figure 3:
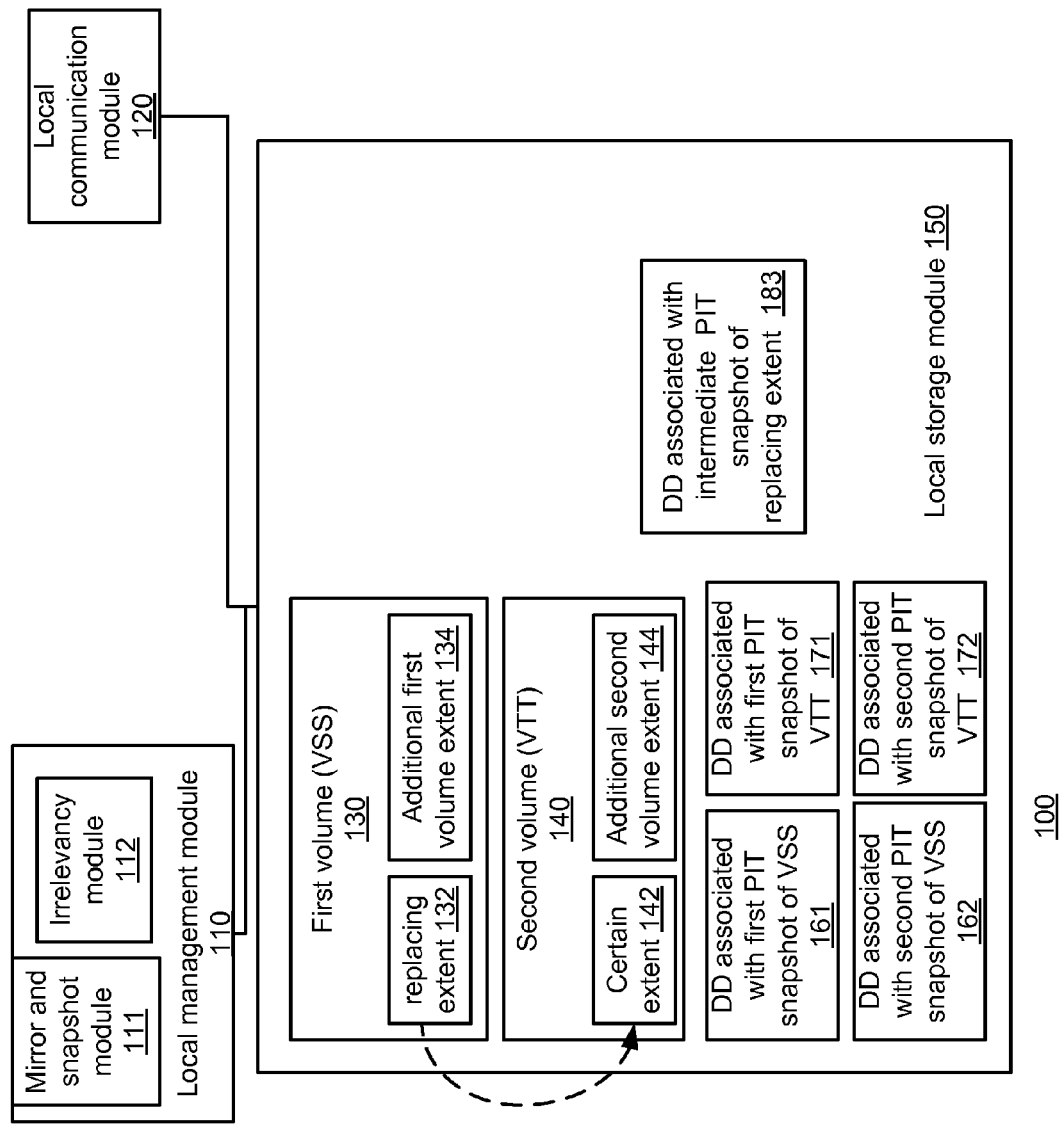
FIG. 3 illustrates a local storage system, according to an embodiment of the invention.

FIG. 3 illustrates the local storage system 150 as storing data deltas 183 associated with an intermediate snapshot of the replacing extent 132.

The creation of the snapshots and the execution of the extended copy command may be executed as an atomic step, may be executed simultaneously, or may be executed in a sequential manner and the like.

The creation of the snapshot can assist in determining the timing of creations of different data deltas, as some data deltas (for example—those related to the certain extent 142 created between Tn and T'n) are irrelevant and should not be transmitted.

It is noted that the local storage system 100 can timestamp the data deltas or otherwise monitor the time of creation of data deltas in any other manner.

At the second point in time (Tn+1) the local storage system 100 creates snapshot SVSSn+1 of VSS and snapshot SVTTn+1 of VTT, and it is ready to start transmitting the relevant data deltas associated with VSS and VTT that were produced between Tn and Tn+1. The relevancy of the data deltas can be determined in response to the execution of the extended copy command.

Accordingly, the local management module 110 can be arranged to select, in response to the extended copy command, out of all data deltas generated between the first and second points in time Tn and Tn+1, selected data deltas to be transmitted to the remote storage system during a transmittal of the Tn+1 snapshots. FIG. 1 illustrates selected data deltas 181 that are sent from the local storage system 100 to the remote storage system 200.

The selected data deltas may exclude data deltas associated with the certain extent 142 that were generated between Tn and T'n—because at intermediate point in time (T'n) the certain extent 142 is replaced by replacing extent 132.

According to an embodiment of the invention the local management module 110 can participate (trigger, control, assist in controlling) in the following stages:
  A. Transmit all data deltas created between Tn and Tn+1 that are related to VSS 130 to RSS 200. These data deltas should form a part of RVSS 230 that reflects VSS 230 at Tn+1. The data deltas relating to the replacing extent 132 and that were generated between Tn and T'n should form a part of RVTT 240—as the certain extent 142 (of VTT) should be replaced by the replacing extent 132 (of VSS) at T'n.
  B. Transmit all data deltas created between Tn and Tn+1 that relate to extents of VTT 140 that differ from the certain extent 142. FIG. 1 illustrates an example of such an extent—additional second volume extent 144. These data deltas should form a part of RVTT.
  C. Send a request (such as second request 184 of FIG. 1) to RSS for executing an extended copy command for copying the data deltas of replacing extent 132 to a mirror copy of certain extent 142. The request can be a part of an extended copy command. The request can be sent in various manners, such as the manner illustrated in US patent application publication serial number 2012/0259961, titled "System of managing remote resources" that may be incorporated herein by reference.
  D. Transmit all data deltas created between T'n and Tn+1 related to the certain extent 142. These data deltas should form a part of RVTT 240 that reflects VTT at Tn+1.

According to an embodiment of the invention the local management module 110 can start the execution of steps B and C once the creation of the intermediate snapshot has been completed (usually this is no more than a couple of seconds after T'n).

Figure 4:
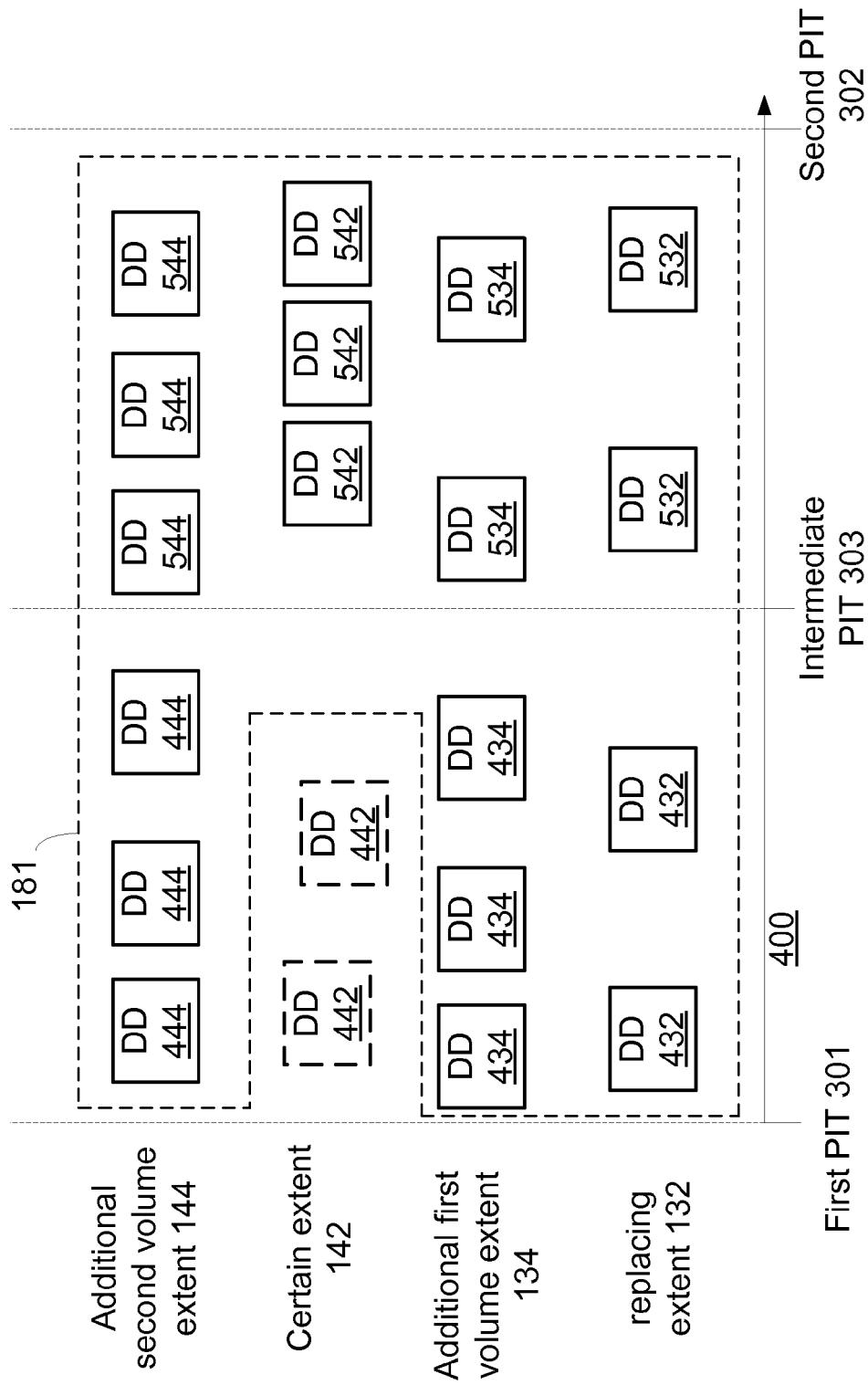
FIG. 4 illustrates various data deltas, according to an embodiment of the invention.
Figure 5:
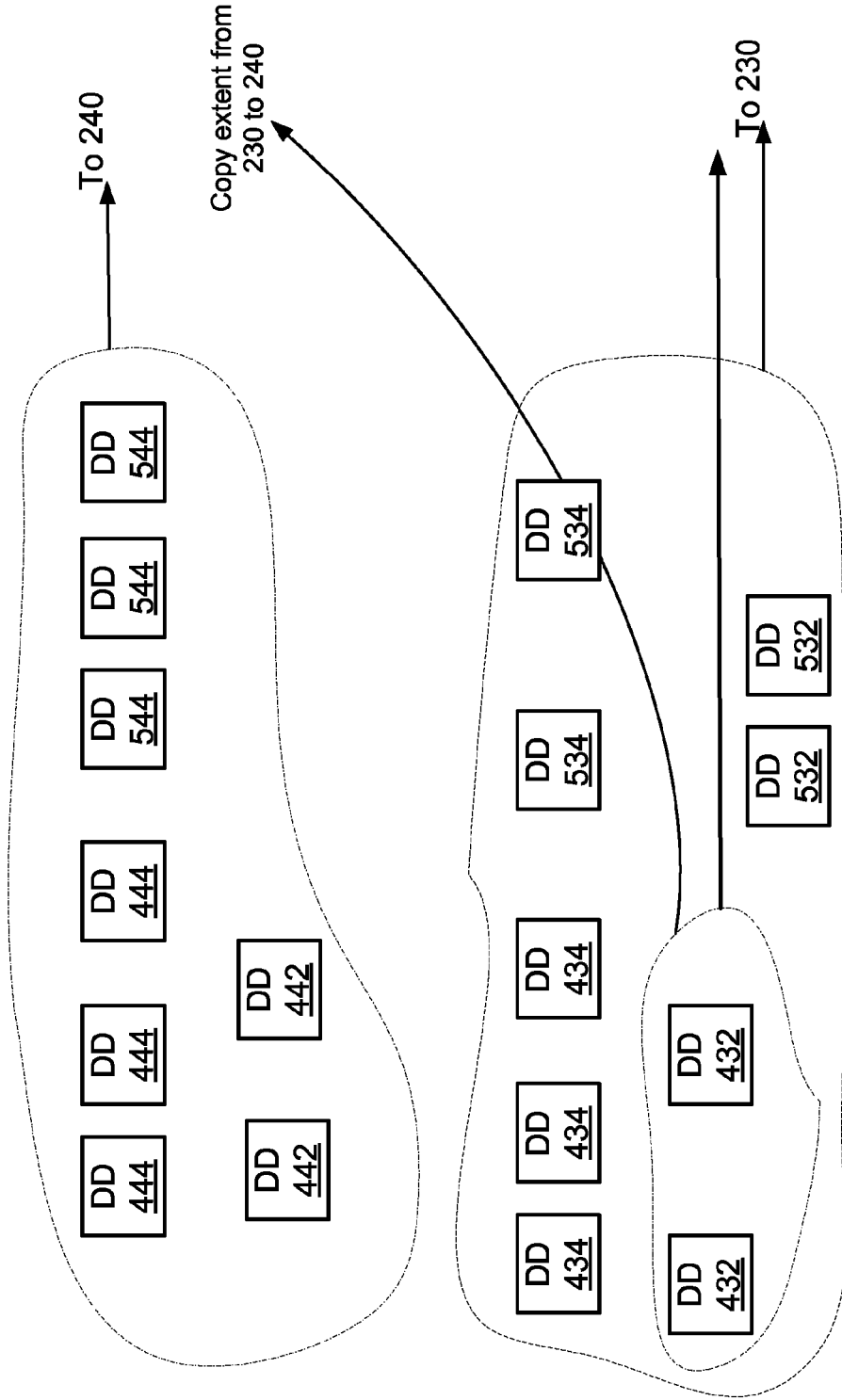
FIG. 5 illustrates various data deltas and the transmission of some data deltas, according to an embodiment of the invention.

Table 1 and FIGS. 4-5 illustrate which data deltas should be transmitted to RSS. Data deltas are represented by the initials DD followed by their reference number in FIGS. 4 and 5:

TABLE 1

|  | Created between Tn and T'n | Created between T'n and Tn + 1 | Comments |
| --- | --- | --- | --- |
| Replacing extent 132 of VSS | DD 432 - relevant. May form DD 183 of FIG. 1. | DD 532 relevant | RSS copies the mirror of the replacing extent (of RVSS) to a mirror of the certain extent (of RVTT). |
| Other extents of VSS (such as 134) | DD 434 - relevant | DD 534 - relevant | DD 432, 532, 434 and 534 may form DD 162 of FIG. 1. DD 432 and 434 may form DD 163 of FIG. 1 |
| Certain extent 142 of VTT (to be replaced) | DD 442 - irrelevant | DD 542 - relevant | DD 432, 444, 542 and 444 may form DD 172 of FIG. 1 |
| Other extents of VTT (such as 144) | DD 444 - relevant | DD 544 - relevant | DD 432 and 444 may form DD 173 of FIG. 1 |

It is noted that between Tn and Tn+1 more than a single Extended Copy command can be received. This will cause the local management module 110 to determine the relevancy of the data deltas taking into account the relevancy of the data deltas—as reflected by the multiple Extended Copy command.

If, for example, different Extended Copy commands refer to non-overlapping extents—then these Extended Copy commands do not affect each other. If there is an overlap between extents affected by different Extended Copy commands the timing of these commands should be taken into account. Each Extended Copy command that causes a certain extent to be irrelevant may cause all data deltas that preceded this Extended command to be irrelevant.

Figure 6:
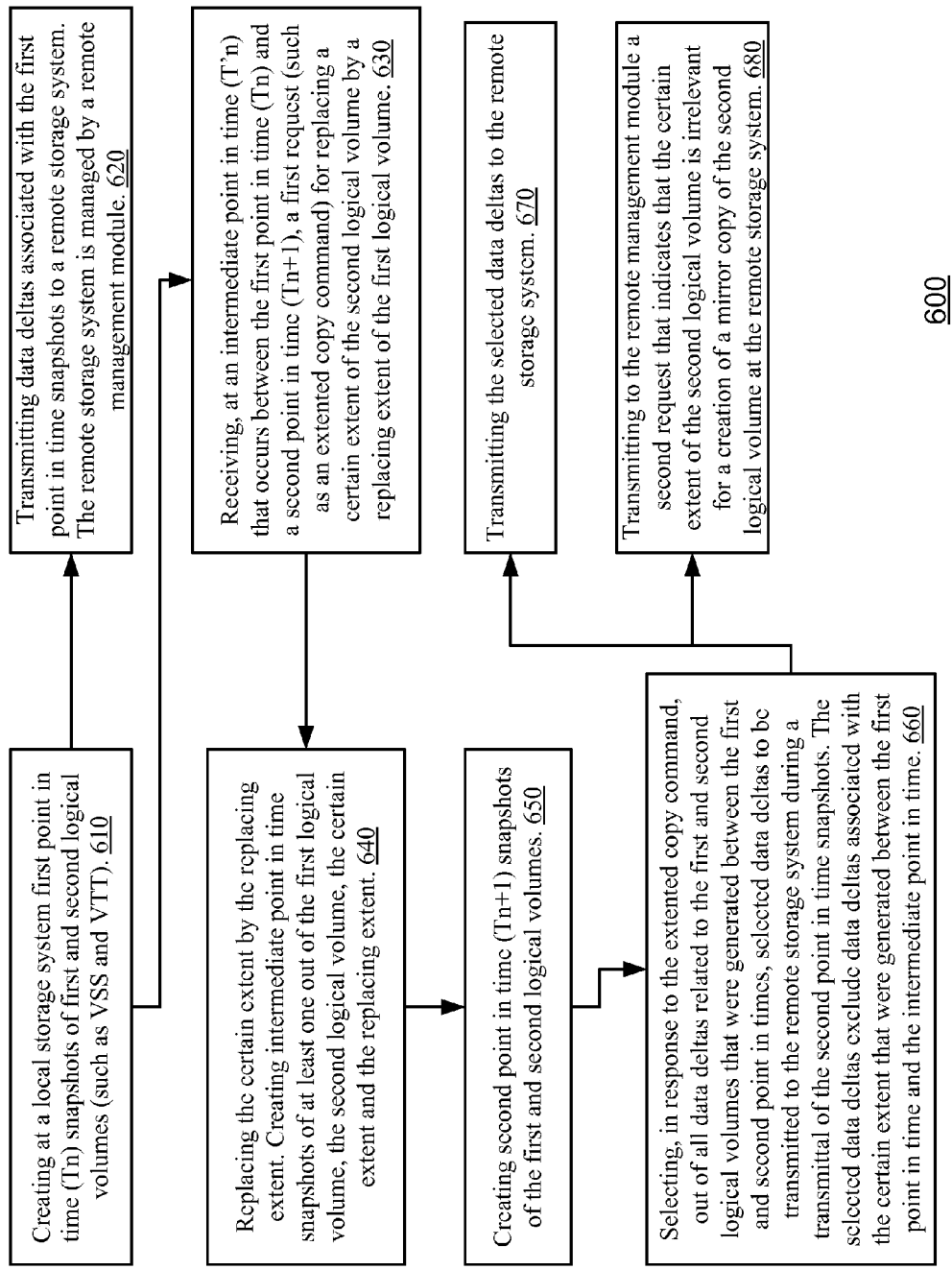
FIG. 6 illustrates a method according to an embodiment of the invention.

FIG. 6 illustrates method 600 according to an embodiment of the invention. Method 600 may be executed by a local storage system that is in communication with a remote storage system.

Method 600 starts by stage 610 of creating at a local storage system first point in time (Tn) snapshots of first and second logical volumes (such as VSS and VTT).

Stage 610 may be followed by stage 620 of transmitting data deltas associated with the first point in time snapshots to a remote storage system. The remote storage system is managed by a remote management module.

Stage 610 may be followed by stage 630 of receiving, at an intermediate point in time (T'n) that occurs between the first point in time (Tn) and a second point in time (Tn+1), a first request (such as an extended copy command) for replacing a certain extent of the second logical volume by a replacing extent of the first logical volume. Stage 630 may occur before the completion of stage 620.

Stage 630 may be followed by stage 640 of replacing the certain extent by the replacing extent.

Stage 640 may also include creating intermediate point in time snapshots of at least one out of the first logical volume, the second logical volume, the certain extent and the replacing extent.

Stage 640 may be followed by stage 650 of creating second point in time (Tn+1) snapshots of the first and second logical volumes.

Stage 650 may be followed by stage 660 of selecting, in response to the extended copy command, out of all data deltas related to the first and second logical volumes that were generated between the first and second point in times, selected data deltas to be transmitted to the remote storage system during a transmittal of the second point in time snapshots. The selected data deltas exclude data deltas associated with the certain extent that were generated between the first point in time and the intermediate point in time.

Stage 660 may be followed by stages 670 and 680.

Stage 670 may include transmitting the selected data deltas to the remote storage system.

Stage 680 may include transmitting to the remote management module a second request that indicates that the certain extent of the second logical volume is irrelevant for a creation of a mirror copy of the second logical volume at the remote storage system.

Responding to an Unmap Command

There are provides methods, storage systems and computer readable media for reducing the amount of data transmitted during asynchronous mirroring if while transmitting data deltas of a logical volume (VTT) the LSS receives an unmap command of an extent of VTT.

Although some of the previous figures referred to an extended copy command, the local storage system 100 may be arranged to reduce the amount of traffic transmitted to RSS 200 when it receives an unmap command that indicates that certain extent 142 is irrelevant.

Assuming that at intermediate point in time T'n LSS 100 receives an unmap command that indicates that certain extent 142 of a logical volume VTT is irrelevant—and the local management module 110 can participate (trigger, control, assist in controlling) in the following stages:

A. Transmit all data deltas created between Tn and Tn+1 that relate to extents of VTT 140 that differ from the certain extent 142. These data deltas should form a part of RVTT.

B. Send a request to RSS for executing an unmap command for making content of the mirror copy of the certain extent irrelevant at T'n—assign a predetermined default value (for example—a string of zeros). The request can be sent in various manners, such as the manner illustrated in US patent application publication serial number 2012/0259961, titled "System of managing remote resources" that may be incorporated herein by reference.

C. Transmit all data deltas created between T'n and Tn+1 related to the certain extent 142. These data deltas should form a part of RVTT 240 that reflects VTT at Tn+1. Data deltas related to the certain extent 142 that were created between Tn and T'n are irrelevant and should not be transmitted.

Figure 7:
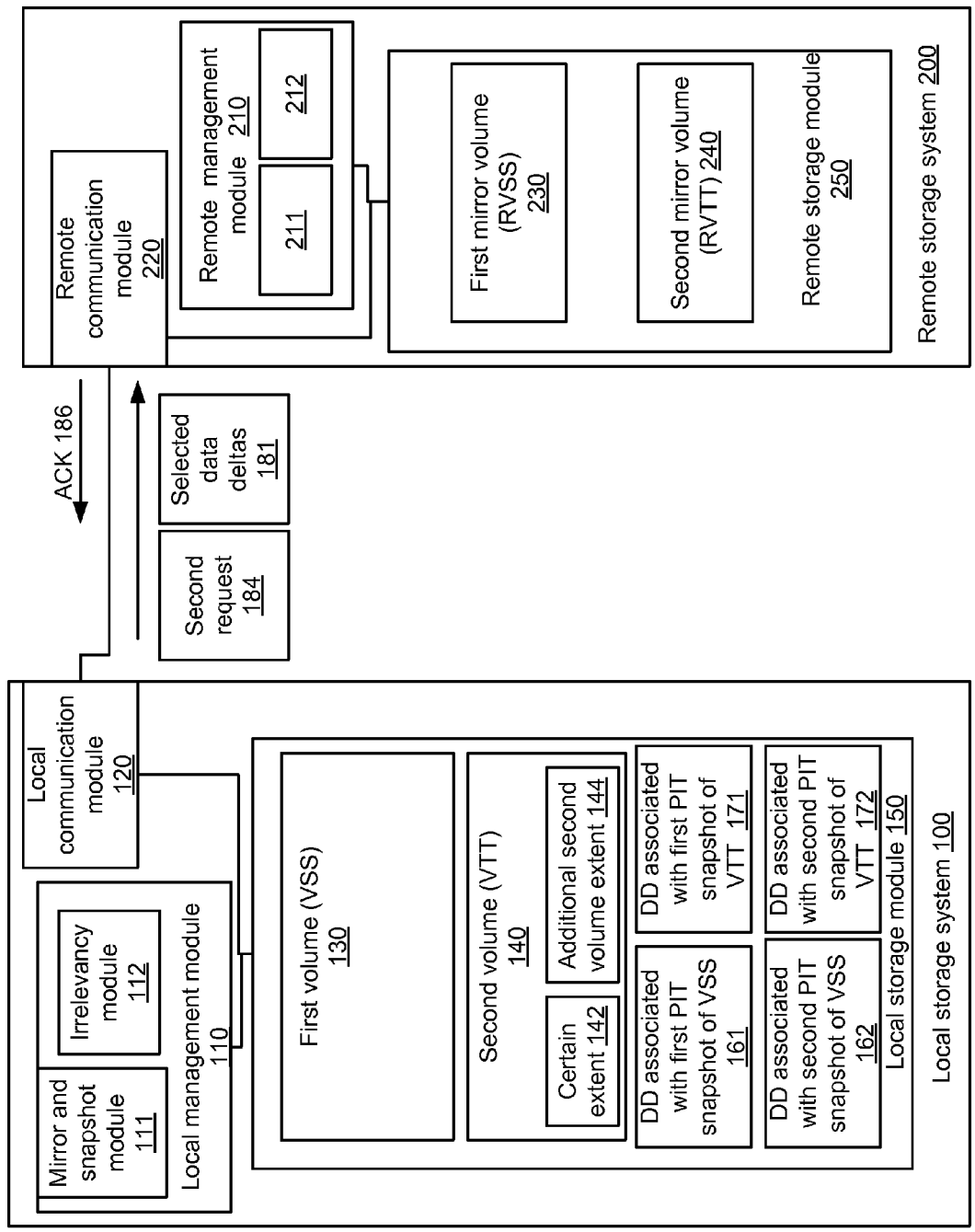
FIG. 7 illustrates a local storage system and a remote storage system, according to an embodiment of the invention.
Figure 8:
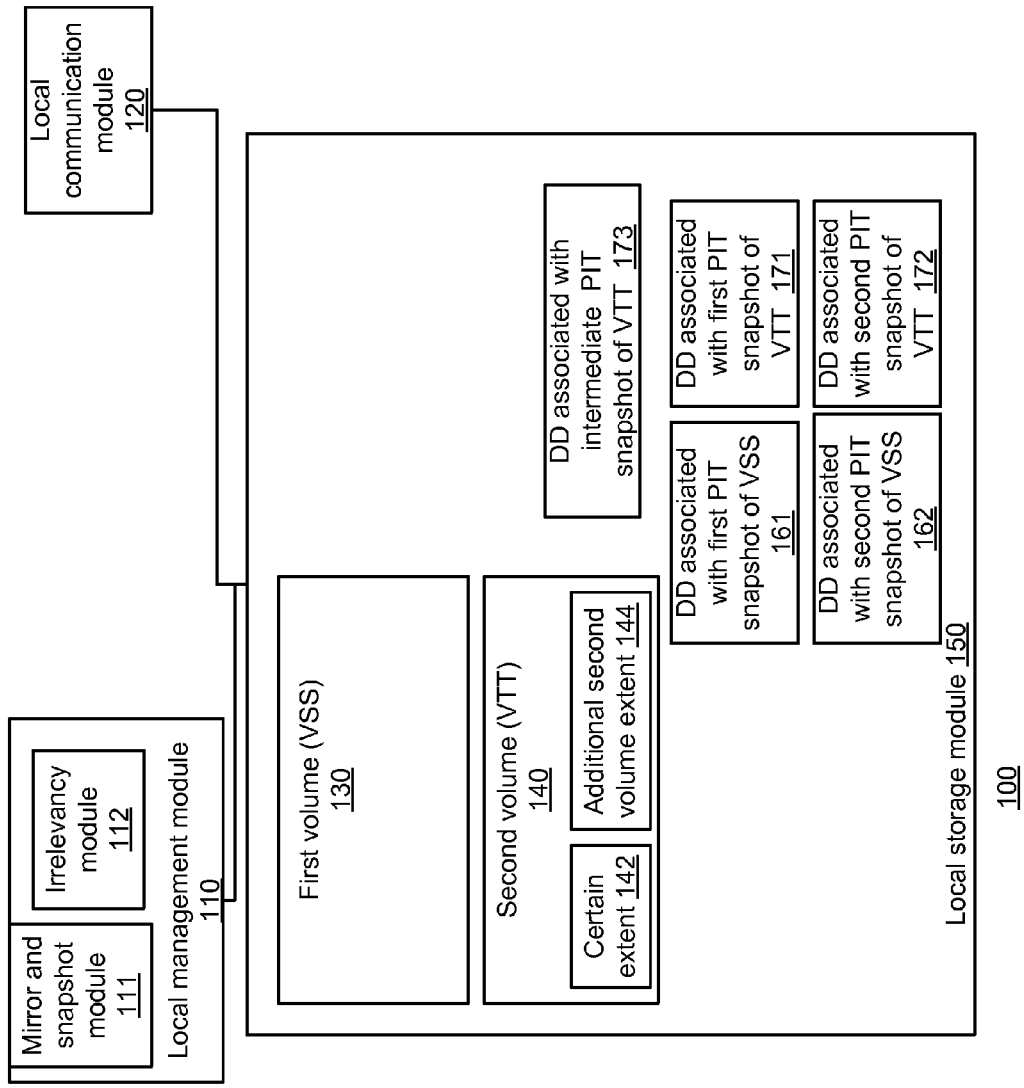
FIG. 8 illustrates a local storage system, according to an embodiment of the invention.
Figure 9:
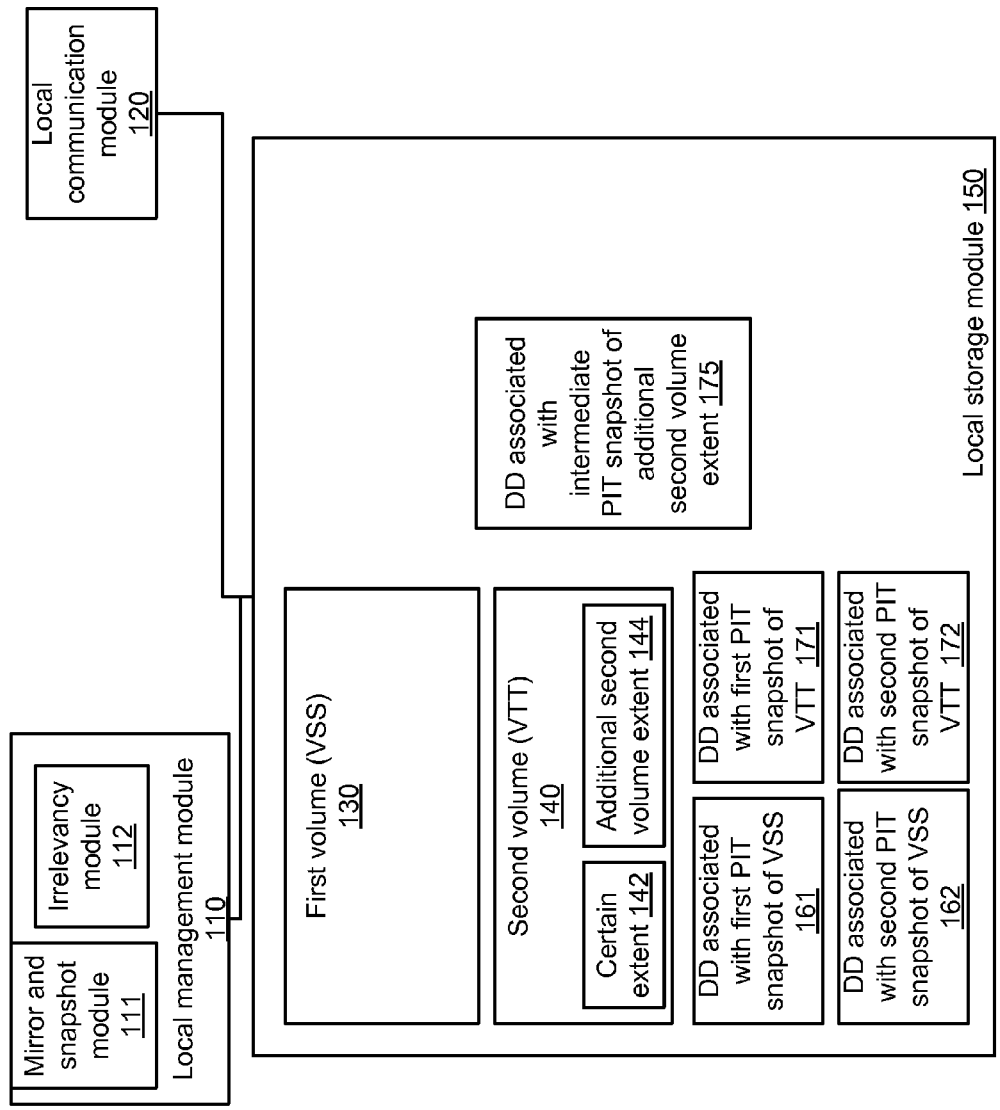
FIG. 9 illustrates a local storage system, according to an embodiment of the invention.

FIGS. 7-9 illustrate local storage system 100 and remote storage system 200 according to various embodiments of the invention.

FIG. 7 differs from FIG. 1 by not illustrating the replacing extent 132 (as the certain extent 142 is unmapped at T'n and not replaced by replacing extent 132). For convenience of explanation FIG. 7 does not illustrate additional first volume extent 134.

FIG. 8 differs from FIG. 7 by illustrating the local storage system 100 as storing an intermediate point in time (T'n) snapshot of VTT 173.

FIG. 9 differs from FIG. 7 by illustrating the local storage system 100 as storing an intermediate point in time (T'n) snapshot 175 of extents of VTT that differ from the certain extent. These extents may include additional second volume extent 144

Figure 10:
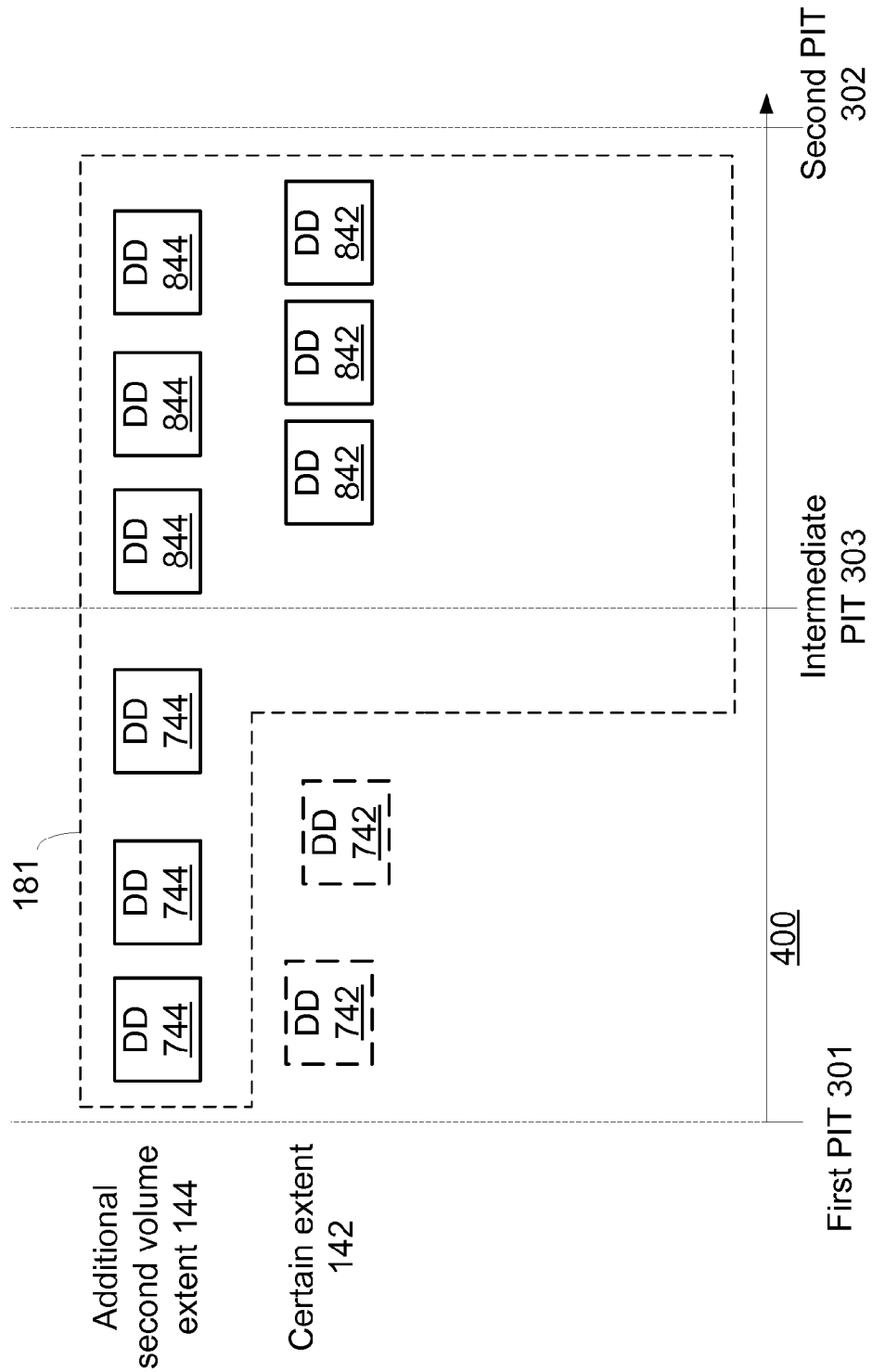
FIG. 10 illustrates various data deltas and the transmission of some data deltas, according to an embodiment of the invention.

Table 2 and FIG. 10 illustrate which data deltas should be transmitted to RSS. Data deltas are represented by the initials DD followed by their reference number in FIG. 10:

TABLE 1

| | Created between Tn and T'n | Created between T'n and Tn + 1 | Comments |
| --- | --- | --- | --- |
| Certain extent 142 of VTT (to be replaced) | DD 742 - irrelevant | DD 842 - relevant | RSS assigns a default value to the mirror of the certain extent to reflect its value at T'n and creates the mirror of the certain extent in response to DD 842 |
| Other extents of VTT (such as 144) | DD 744 - relevant | DD 844 - relevant | |

Figure 11:
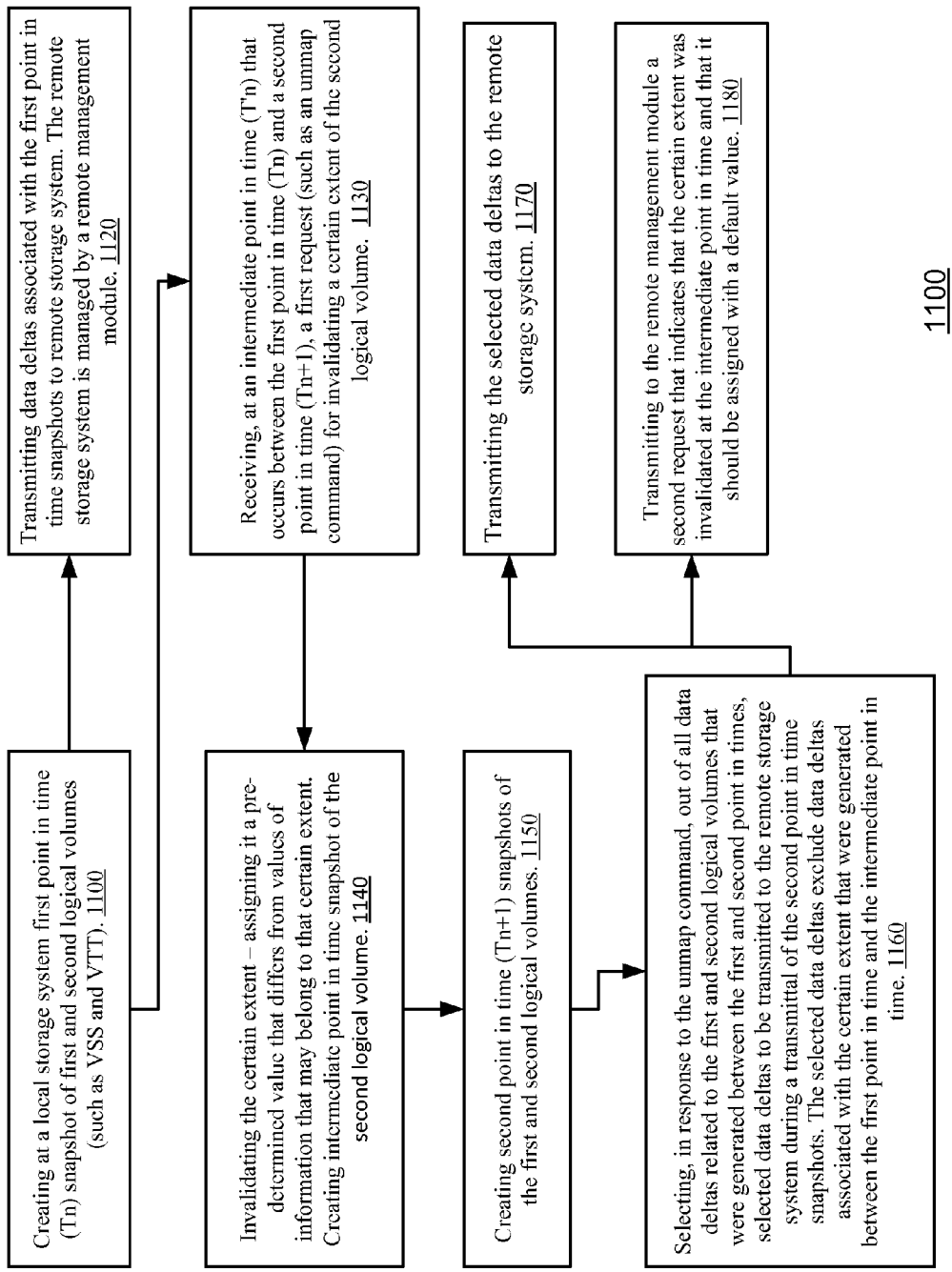
FIG. 11 illustrates a method according to an embodiment of the invention.

FIG. 11 illustrates method 1100 according to an embodiment of the invention. Method 1100 may be executed by a local storage system that is in communication with a remote storage system.

Method 1100 starts by stage 1110 of creating at a local storage system first point in time (Tn) snapshot of first and second logical volumes (such as VSS and VTT).

Stage 1110 may be followed by stage 1120 of transmitting data deltas associated with the first point in time snapshots to remote storage system. The remote storage system is managed by a remote management module.

Stage 1110 may be followed by stage 1130 of receiving, at an intermediate point in time (T'n) that occurs between the first point in time (Tn) and a second point in time (Tn+1), a first request (such as an unmap command) for invalidating a certain extent of the second logical volume. Stage 1130 may occur before the completion of stage 1120.

Stage 1130 may be followed by stage 1140 of invalidating the certain extent—assigning it a pre-determined value that differs from values of information that may belong to that certain extent.

Stage 1140 may also include creating intermediate point in time snapshot of the second logical volume.

Stage 1140 may be followed by stage 1150 of creating second point in time (Tn+1) snapshots of the first and second logical volumes.

Stage 1150 may be followed by stage 1160 of selecting, in response to the unmap copy command, out of all data deltas related to the first and second logical volumes that were generated between the first and second point in times, selected data deltas to be transmitted to the remote storage system during a transmittal of the second point in time snapshots. The selected data deltas exclude data deltas associated with the certain extent that were generated between the first point in time and the intermediate point in time.

Stage 1160 may be followed by stages 1170 and 1180.

Stage 1170 may include transmitting the selected data deltas to the remote storage system.

Stage 1180 may include transmitting to the remote management module a second request that indicates that the certain extent was invalidated at the intermediate point in time and that it should be assigned with a default value.

Figure 12:
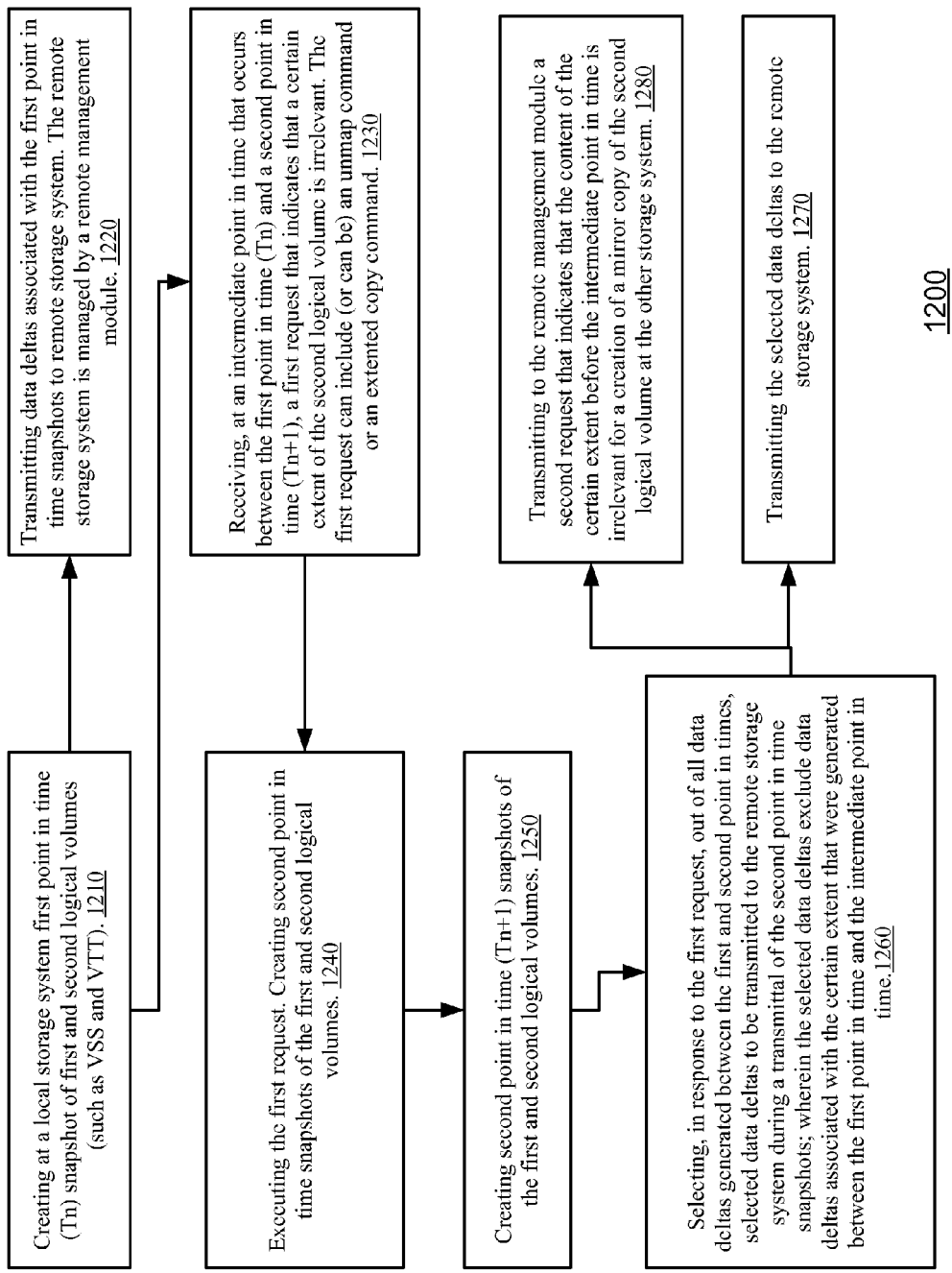
FIG. 12 illustrates a method according to an embodiment of the invention.

FIG. 12 illustrates method 1200 according to an embodiment of the invention. Method 1200 may be executed by a local storage system that is in communication with a remote storage system.

Method 1200 starts by stage 1210 of creating at a local storage system first point in time (Tn) snapshot of first and second logical volumes (such as VSS and VTT).

Stage 1210 may be followed by stage 1220 of transmitting data deltas associated with the first point in time snapshots to remote storage system. The remote storage system is managed by a remote management module.

Stage 1210 may be followed by stage 1230 of receiving, at an intermediate point in time that occurs between the first point in time (Tn) and a second point in time (Tn+1), a first request that indicates that a certain extent of the second logical volume is irrelevant. The first request can include (or can be) an unmap command or an extended copy command.

Stage 1230 may be followed by stage 1240 of executing the first request. Stage 1240 may also include creating second point in time snapshots of the first and second logical volumes.

Stage 1240 may be followed by stage 1250 of creating second point in time (Tn+1) snapshots of the first and second logical volumes.

Stage 1250 may be followed by stage 1260 of selecting, in response to the first request, out of all data deltas generated between the first and second point in times, selected data deltas to be transmitted to the remote storage system during a transmittal of the second point in time snapshots; wherein the selected data deltas exclude data deltas associated with the certain extent that were generated between the first point in time and the intermediate point in time.

Stage 1260 may be followed by stage 1270 of transmitting the selected data deltas to the remote storage system.

Stage 1260 may be followed by stage 1280 of transmitting to the remote management module a second request that indicates that the content of the certain extent before the intermediate point in time is irrelevant for a creation of a mirror copy of the second logical volume at the other storage system. The first request can be, for example, an extended copy command or a unmap command and the second request reflects the command included in the first request.

LIST OF REFERENCE NUMBERS

100 Local storage system (LSS)
110 Local management module
111 Mirror and snapshot module
112 Irrelevancy module
120 Local communication module
130 First logical volume (VSS)
132 Replacing extent
134 Additional first volume extent
140 Second logical volume (VTT)
142 Certain extent
144 Additional second volume extent
150 Local storage module
161 Data deltas associated with the first point in time (Tn) snapshot of VSS
162 Data deltas associated with the second point in time (Tn+1) snapshot of VSS
163 Data deltas associated with the intermediate point in time (T'n) snapshot of VSS
171 Data deltas associated with the first point in time (Tn) snapshot of VTT
172 Data deltas associated with the second point in time (Tn+1) snapshot of VTT
173 Data deltas associated with the intermediate point in time (T'n) snapshot of VTT
175 Data deltas associated with the intermediate point in time snapshot of additional second volume extent
181 Selected data deltas
183 Data deltas associated with the intermediate point in time (T'n) snapshot of replacing extent
184 Second request
200 Remote storage system (RSS)
210 Remote management module
211 Remote mirror and snapshot module
212 Remote irrelevancy module
220 Remote communication module
230 First mirror volume (RVSS)
232 Mirror of replacing extent
242 Mirror of certain extent
250 Remote storage module The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A storage system that comprises a management module, a communication module and a storage module;

wherein the storage system is arranged to create first point in time snapshots of first and second logical volumes;

wherein the communication module is arranged to transmit data deltas associated with the first point in time snapshots to another storage system; wherein the other storage system is managed by another management module;

wherein the management module is arranged to:
receive, at an intermediate point in time that occurs between the first point in time and a second point in time, a first request that indicates that a certain extent of the second logical volume is irrelevant;
participate in a creation of second point in time snapshots of the first and second logical volumes;
select, in response to the first request, out of all data deltas generated between the first and second point in time, selected data deltas to be transmitted to the other storage system; wherein the selected data deltas exclude data deltas associated with the certain extent that were generated between the first point in time and the intermediate point in time;

wherein the communication module is further arranged to:
transmit the selected data deltas to the other storage system; and
transmit to the other management module a second request that indicates that a content, before the intermediate point in time, of the certain extent of the second logical volume is irrelevant for a creation of a mirror copy of the second logical volume at the other storage system.

2. The storage system according to claim 1, wherein the first request is an extended copy command for replacing the certain extent by a replacing extent of the first logical volume.

3. The storage system according to claim 2, wherein the management module is arranged to participate in a creation of intermediate point in time snapshots of the first and second logical volumes.

4. The storage system according to claim 2, wherein the management module is arranged to participate in a creation of an intermediate point in time snapshot of the replacing extent.

5. The storage system according to claim 4, wherein the communication module is arranged to transmit the selected data deltas to the other storage system after a completion of the creation of the intermediate point in time snapshot of the replacing extent.

6. The storage system according to claim 2, wherein the management module is arranged to execute the extended copy command and to participate in the creation of an intermediate point in time snapshot of the replacing extent as an atomic operation.

7. The storage system according to claim 2, wherein the management module is arranged to execute the extended copy command and to participate in the creation of an intermediate point in time snapshot of the first and second logical volumes as an atomic operation.

8. The storage system according to claim 2, wherein the management module is arranged to select selected data deltas that comprise data deltas associated with the certain extent that were generated between the intermediate point in time and the second point in time.

9. The storage system according to claim 2, wherein the management module is arranged to send to the other management module the second request, wherein the second request is for replacing a mirror copy of the certain extent by a mirror copy of the replacing extent.

10. The storage system according to claim 1, wherein the first request is a un-map command.

11. The storage system according to claim 10, wherein the management module is arranged to participate in a creation of an intermediate point in time snapshot of the second logical volume.

12. The storage system according to claim 11, wherein the management module is arranged to execute the un-map command and to participate in the creation of the intermediate point in time snapshot of the second logical volume as an atomic operation.

13. The storage system according to claim 1, wherein the management module is arranged to:
receive, at a further point in time that occurs between the intermediate point in time and the second point in time, a further request that indicates that a further extent of the second logical volume is irrelevant;
select, in response to the further request and the first request, out of all data deltas generated between the first and second point in times, selected data deltas to be transmitted to the other storage system during a transmittal of the second point in time snapshots; wherein the selected data deltas exclude data deltas associated with the certain extent that were generated between the first point in time and the intermediate point in time and exclude data deltas associated with the further extent generated between the first point in time and the further point in time.

14. A method, comprising:
creating at a storage module first point in time snapshots of first and second logical volumes;
transmitting data deltas associated with the first point in time snapshots to another storage system; wherein the other storage system is managed by another management module;
receiving, at an intermediate point in time that occurs between the first point in time and a second point in time, a first request that indicates that a certain extent of the second logical volume is irrelevant;
creating second point in time snapshots of the first and second logical volumes;
selecting, in response to the first request, out of all data deltas generated between the first and second point in times, selected data deltas to be transmitted to the other storage system during a transmittal of the second point in time snapshots; wherein the selected data deltas exclude data deltas associated with the certain extent that were generated after the intermediate point in time;
transmitting the selected data deltas to the other storage system; and
transmitting to the other management module a second request that indicates that a content, before the intermediate point in time, of the certain extent of the second logical volume is irrelevant for a creation of a mirror copy of the second logical volume at the other storage system.

15. A non-transitory computer readable medium that stores instructions to be executed by a storage system for:
creating at a storage module first point in time snapshots of first and second logical volumes;
transmitting data deltas associated with the first point in time snapshots to another storage system; wherein the other storage system is managed by another management module;
receiving, at an intermediate point in time that occurs between the first point in time and a second point in time, a first request that indicates that a certain extent of the second logical volume is irrelevant;

creating second point in time snapshots of the first and second logical volumes;

selecting, by a management module of the storage system and in response to the first request, out of all data deltas generated between the first and second point in times, selected data deltas to be transmitted to the other storage system during a transmittal of the second point in time snapshots; wherein the selected data deltas exclude data deltas associated with the certain extent that were generated between the first point in time and the intermediate point in time;

transmitting the selected data deltas to the other storage system; and transmitting to the other management module a second request that indicates that the certain extent of the second logical volume is irrelevant for a creation of a mirror copy of the second logical volume at the other storage system.

16. The non-transitory computer readable medium according to claim 15 wherein the first request is an extended copy command for replacing the certain extent by a replacing extent of the first logical volume.

17. A management module of a storage system, the management module is arranged to:

receive, at an intermediate point in time that occurs between a first point in time during which a first point in time snapshots of a first and second logical volumes are created and a second point in time during which a second point in time snapshots of the first and second logical volume are created, a first request that indicates that a certain extent of the second logical volume is irrelevant;

participate in a creation of the second point in time snapshots of the first and second logical volumes;

select, in response to the first request, out of all data deltas generated between the first and second point in time, selected data deltas to be transmitted to the other storage system; wherein the selected data deltas exclude data deltas associated with the certain extent that were generated between the first point in time and the intermediate point in time;

instruct a communication module to transmit the selected data deltas to the other storage system; and transmit to the other management module a second request that indicates that a content, before the intermediate point in time, of the certain extent of the second logical volume is irrelevant for a creation of a mirror copy of the second logical volume at the other storage system.

* * * * *